United States Patent [19]

Copher et al.

[11] 4,183,489

[45] Jan. 15, 1980

[54] ADJUSTABLE BRACKET

[76] Inventors: Joseph E. Copher, 3607 Monroe St., Bellwood, Ill. 60104; Arthur B. Lucas, 8714 W. Fullerton, River Grove, Ill. 60121

[21] Appl. No.: 962,015

[22] Filed: Nov. 20, 1978

[51] Int. Cl.² .......................... A47F 5/00; A47H 1/10
[52] U.S. Cl. .................................... 248/278; 248/122
[58] Field of Search ............... 248/278, 279, 280.1, 248/281.1, 122, 324; 179/149, 153

[56] References Cited

U.S. PATENT DOCUMENTS

| 619,445 | 2/1899 | Smith | 248/281.1 X |
|---|---|---|---|
| 801,664 | 10/1905 | Holtmann | 248/279 |
| 844,083 | 2/1907 | Barrella | 248/279 |
| 1,063,220 | 6/1913 | Seamon | 248/278 |
| 1,275,311 | 8/1918 | Schumacher | 248/279 |
| 1,283,446 | 11/1918 | Anderson | 248/279 |
| 1,639,448 | 8/1927 | Ashbrook | 248/281.1 X |
| 2,936,726 | 5/1960 | Ganorud | 248/278 X |
| 3,417,953 | 12/1968 | Hillquist et al. | 248/324 X |
| 3,971,538 | 7/1976 | Marvich | 248/122 X |

FOREIGN PATENT DOCUMENTS

| 2051104 | 10/1970 | Fed. Rep. of Germany | 179/149 |
|---|---|---|---|
| 980084 | 5/1951 | France | 248/278 |
| 20307 | of 1903 | United Kingdom | 248/278 |

*Primary Examiner*—J. Franklin Foss
*Attorney, Agent, or Firm*—Leonard S. Knox

[57] ABSTRACT

An adjustable bracket adapted to be secured to a rigid surface and firmly held in a selected position over a wide range. Its paramount advantage is the ease with which the adjusted position may be realized and the object rigidly held therein against vibration and shock.

4 Claims, 5 Drawing Figures

ADJUSTABLE BRACKET

FIELD AND BACKGROUND OF THE INVENTION

In the case of hospitals, sanatoria and other institutions for the accommodation of bed-ridden patients there has been an increased use of instruments for monitoring the patient's response to treatment and the diagnosis of his condition. Certain of such instruments are in the nature of electronic assemblies, e.g., for telemetering and are subjected to considerable handling and abuse, not only by members of the staff, but frequently by the patient. The equipment, as often as not, is unfamiliar to the patient and, since some of them resemble a standard cradle-type telephone, are often moved carelessly or dropped in handling.

Although adjustable brackets of the class here involved are known, none known to use have been conceived with the specific object of rigidly supporting the instrument while providing ready adjustability. Accordingly, our invention has these desiderata as principal objects.

A further object is the attainment of these objectives by means of a minimum number of inexpensive parts readily adapted to sterilization, re-finishing and freedom from complications.

Another object is to achieve an arrangement for the purposes stated from which springs, counterbalances and other biasing expedients have been eliminated to insure against a helpless patient being trapped between parts of the device and with consequent injury.

Another object resides in a construction for the several joints which provide adjustability which are themselves sturdily constructed in order to avoid looseness in one or more thereof which, if allowed to cumulate, would lead to intolerable alteration in a once-established position.

SUMMARY OF THE INVENTION

The invention will be disclosed exemplificatively as embodied in a bracket, most conveniently denominated as universally adjustable, in a manner as will appear from the ensuing description. In order to amount the bracket on a rigid surface, it is provided with a rigid base, to which a first arm is secured through the medium of a first pivotal joint having two degrees of freedom. At the opposite end of this first arm is secured a second pivotal joint having two degrees of freedom. From this second joint extends a second arm and, at the opposite end of the second arm, is a third joint having two degrees of freedom. To this latter a platform or other support is secured, upon which a telephone or other instrument may rest. The several pivotal joints may, if desired, be provided with stops to limit movement thereof to a specific range to prevent the platform from inadvertently occupying unwanted positions. The several rotatable joints are desirably provided with friction washers to render retention of a selected platform position easier and more reliable. Nuts, dished washers or the like may be used.

By manipulating the several arms with respect to each other, translationally and/or rotataby the object supported on the bracket may be placed in an infinite number of positions limited only by the dimensions of the several arms.

DESCRIPTION OF THE PREFERRED EMBODIMENT

Figure 2:
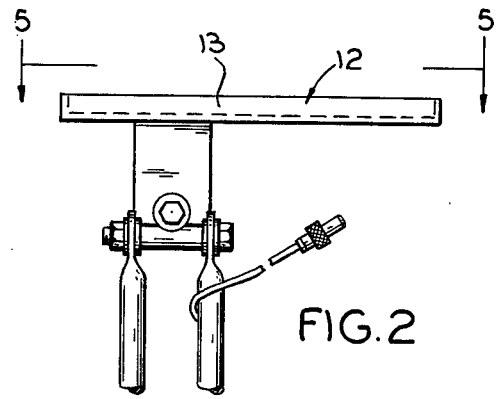
FIG. 2 is detail view taken in the direction of the arrows 2—2 of FIG. 1.

Adverting to the drawing there is shown an adjustable bracket embodying the invention as adapted to supporting, for example, a cradle-type telephone 10 on a shelf 12 as the same might be conveniently located at the bedside of a hospital patient. To avoid inadvertent dislodgment of the instrument, a flange 13 or equilavent means extends peripherally of the base. Any clearance holes required around parts protruding from the bottom of the telephone may be accommodated by apertures 15.

The first joint (FIG. 4) is indicated generally by the numeral 21 and comprises a fixed part 21a, in this case a bent bar or rod 21b passing through an aperture in a plate 18 is threaded to receive a pair of adjusting nuts 24—24 and lock washers 25—25 whereby the plate 18 may be secured in position, as will be clear. The other end of the bar 21a is threaded to receive two nuts 27—27 and associated lock washers 28—28. A sleeve 29 extends between the washers 28—28. By suitably loosening or tightening the nuts 27—27 the sleeve may be rotatably adjusted, thus allowing for a second degree of freedom.

Figure 1:
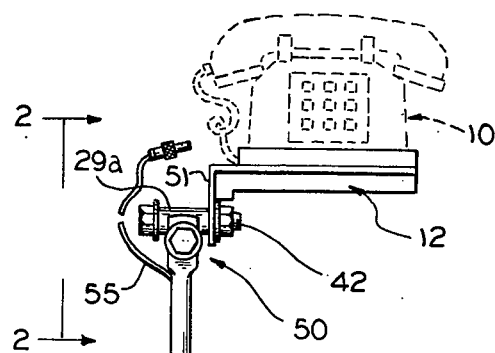
FIG. 1 is a side elevational view of the bracket.
Figure 4:
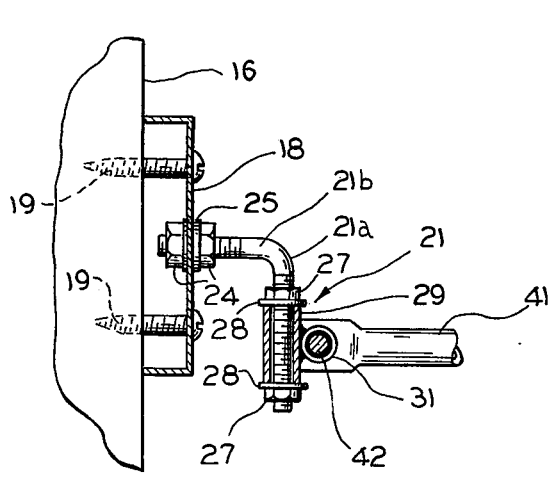
FIG. 4 is a detail view taken in the direction of the arrows 4—4 of FIG. 1.
Figure 5:
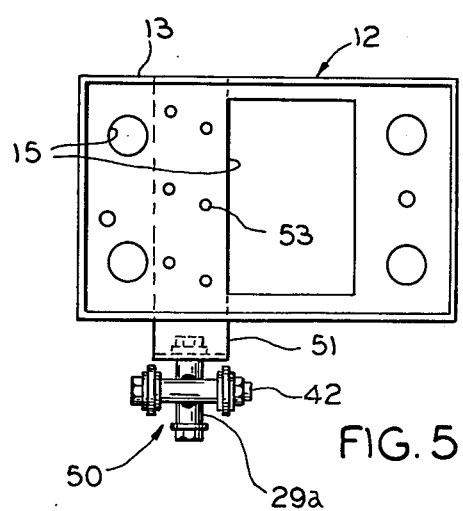
FIG. 5 is a detail view taken in the direction of the arrows 5—5 of FIG. 1.

A second sleeve 31 is integrated with the first sleeve 29, as by welding (FIGS. 1 and 4). Nuts 32—32 and washers 28—28 are employed to fasten the sleeve in position. Tubular struts 41—41, having their ends flattened, provide a third degree of freedom.

At their inner end the struts 41—41 are drilled to pass the stud 42.

Figure 3:
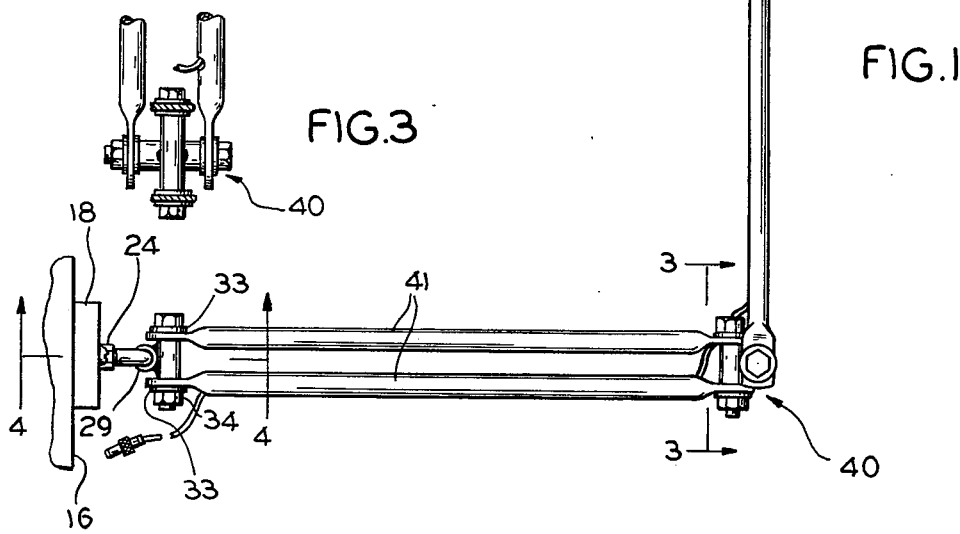
FIG. 3 is a detail view taken in the direction of the arrows 3—3 of FIG. 1.

The pivotal joint indicated generally at 40 may best be considered by reference to FIGS. 1 and 3, and affords another two degrees of freedom and, considered with their accompanying description, constitutes a fifth degree of freedom. Similarly with respect to the pivotal joint 50 which affords a sixth degree of freedom. This latter joint 50 carried the shelf 12 referred to above. The details of construction of the joints 40 and 50 are believed to be apparent from the description heretofore given.

For securing the bracket assembly as an entirety to a fixed surface, e.g., a wall 16, a box 18 or equivalent is provided, togeher with screws 19. A right angle piece 51 serves to join the shelf 12 to the adjacent sleeve 29a.

Line cords, such as 55, may conveniently be housed within the interior of the several tubular arms such as 41, and by-passed exteriorly around the several joints such as 40 and 50. The limit stops heretofore referred to may be so arranged as to prevent such movement of the joints as might damage the line cord and other wiring connected to instruments carried on the bracket.

One outstanding advantage of the invention bracket is its use of standard parts, such as the studs, nuts, bolts and sleeves forming a major portion of the several joints such as 40 and 50. In this way the expense of tooling for the production of special parts is avoided and costs materially reduced.

We claim:

1. A universally adjustable bracket comprising a mounting end and an object-supporting end:
   (a) means at one end to secure the bracket by its mounting end to a supporting surface;
   (b) a rotatably adjustable stud extending from the bracket-mounting means;
   (c) means to lock the stud in a selected angular position,
   (d) a first rotatably adjustable sleeve received over the stud;
   (e) means to lock the first sleeve in a selected angular position;
   (f) a second sleeve having a longitudinal axis and affixed to the first sleeve with the respective axes at right angles;
   (g) a first pair of spaced parallel coextensive arms extending outwardly from the second sleeve and jointly adjustably secured to the second sleeve;
   (h) a third sleeve having a longitudinal axis to space the opposite distal ends of the first arms;
   (i) means to effect angular adjustment of the third sleeve;
   (j) means to maintain said angular adjustment;
   (k) a fourth sleeve having a longitudinal axis affixed with its axis perpendicular to the axis of the third sleeve;
   (l) a second pair of spaced parallel coextensive arms secured to and extending outwardly from the fourth sleeve;
   (m) a fifth sleeve between the respective distal ends of the second pair of arms;
   (n) means enabling angular adjustment of the fifth sleeve;
   (o) means to maintain the adjusted position;
   (p) a sixth sleeve having a longitudinal axis secured transversely of the fifth sleeve; and
   (q) means carried by the sixth sleeve to support an ultimate object on the bracket.

2. An adjustable bracket comprising a first pair of struts, each having an axis, said axes being parallel, a first sleeve at one end of said first pair of struts and secured thereto to space the struts, a second sleeve at the opposite end of the first pair of struts secured thereto to space the same, the respective axes of the first and second sleeves being parallel and perpendicular to the axes of the struts, the first and second struts being adjustably secured to the respective first and second sleeves, means to attach the first sleeve to an ultimate support, a second pair of struts, the opposite ends of said second pair of struts being respectively provided with third and fourth sleeves, the second and third sleeves being mutually secured with their axes at right angles, means associated with the first, second, third and fourth sleeves to enable swivel-type adjustment of the several sleeves and struts to occupy selected angular positions in space, means to maintain a selected angular position, a fifth sleeve at the opposite end of the second pair of struts, means associated with the second pair of struts and fifth sleeve to adjustably secure them with their axes in a selected adjusted position, means to maintain a selected angular position, and means forming part of the fifth sleeve to support the object carried on the bracket.

3. The combination in accordance with claim 2 in which the several struts each have bores coaxial with the sleeves, threaded studs are received in the aligned bores and nuts are threadedly engaged with the studs which, when tightened maintain struts in a selected angular relation.

4. The combination in accordance with claim 2 further characterized in that each strut comprises a section of tubing flattened at the ends, the several sleeves terminate in planes normal to the sleeve axis and the sleeves and struts are provided at the ends with nuts to clamp the struts and sleeves to maintain a selected adjusted position thereof.

* * * * *